UNITED STATES PATENT OFFICE.

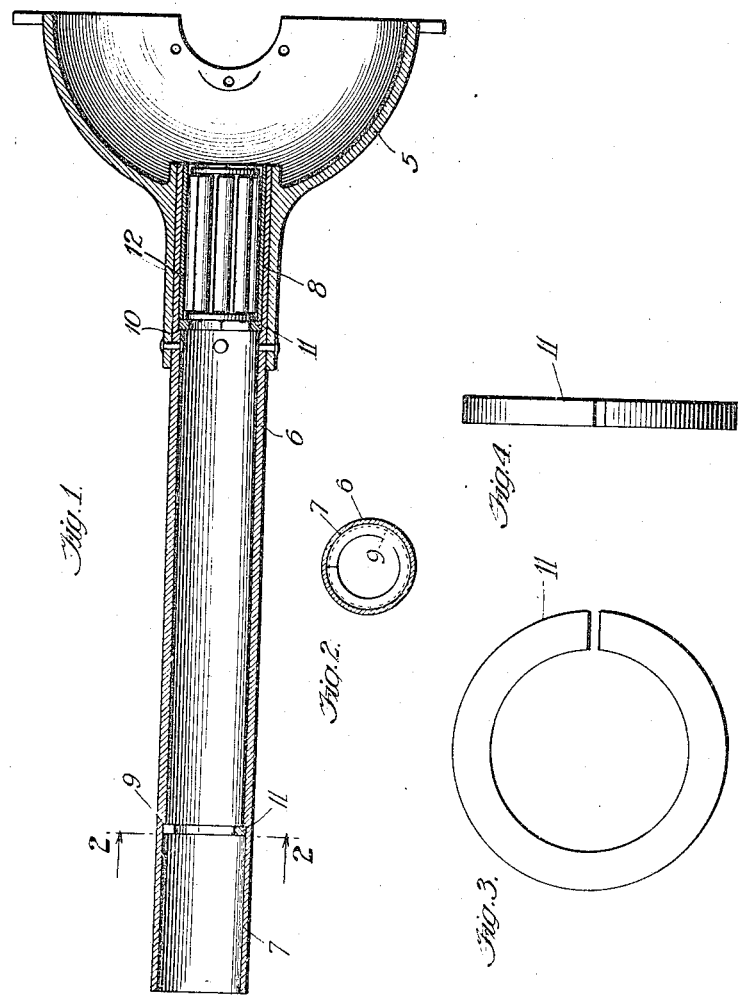

HARVEY L. FISHER, OF CHICAGO, ILLINOIS, ASSIGNOR TO DONALDSON & FISHER COMPANY, OF CHICAGO, ILLINOIS, A CORPORATION OF ARIZONA.

DIFFERENTIAL AND AXLE HOUSING.

1,289,143.      Specification of Letters Patent.      Patented Dec. 31, 1918.

Application filed January 13, 1917. Serial No. 142,142.

*To all whom it may concern:*

Be it known that I, HARVEY L. FISHER, a citizen of the United States, residing at Chicago, in the county of Cook and State of Illinois, have invented certain new and useful Improvements in Differential and Axle Housings, of which the following is a specification.

My invention relates to a certain detail in the construction of a differential and axle housing by which increased efficiency is secured at a lower cost than that of constructions for the same purpose heretofore employed.

In the accompanying drawing Figure 1 is a longitudinal central section of half of a differential and axle housing; Fig. 2 a transverse section upon the line 2—2 thereof looking in the direction of the arrow; Figs. 3 and 4 a face and edge view respectively of a ring employed in my improved construction.

Referring to Fig. 1 it will be understood that the half housing 5 and the axle sleeve or housing 6 are duplicated upon the other side of the machine, and that these parts, except in the respect hereinafter pointed out, are of common and known construction. They receive the differential and axles which may be of any desired construction and therefore are not shown herewith.

Prior to my invention it has been customary to mount bearings in the ends of the axle sleeve or casing to support the axle and in order to prevent axial movement of the bearings it has been the common practice to insert at a suitable distance from each end of the sleeve or casing a ring or annulus and securing the same in place by rivets extending through the walls of the sleeves. The bearings have been then put in place with the adjacent edges of their sleeves or jackets against the rings. This prior art construction is objectionable in that the riveting of the rings in place is expensive requiring skilled labor, and the presence of the rivet holes weakens the axle casings in a serious manner.

My invention consists in reaming out the ends of the housing sleeves as at 7, 8, to form slight shoulders at 9, 10 and providing a stout split ring 11 for each end of the axle casing, which is compressed to reduce its diameter and inserted in the end of the axle. The ring is then permitted to expand and is driven home against the shoulder 9, 10. There is of course no tendency to drive the rings toward the ends of the casings when in use, and the resiliency thereof holds them in close frictional contact against the casing while any force tending to drive the rings farther into the casing is resisted effectively by the shoulders upon the latter. In the drawing I have shown an ordinary form of roller bearing 12 inserted in one end of the axle casing and it is to be understood that a similar roller bearing will be inserted in the other end of the axle casing, and that these bearings may be of any known or approved design of which a number are found upon the market.

My improved construction of housing is inexpensive to make since the reaming of the ends thereof to provide the shoulders and the insertion and driving home of the stop rings may be done by unskilled labor. Furthermore it avoids weakening the tube by boring the holes for the rivets and dispenses with the skilled labor necessary to apply and upset the rivets.

I claim:

1. An axle casing, the bore of which is enlarged toward the end thereby forming a shoulder, and a ring having a driving fit within the bore and abutting against said shoulder.

2. An axle casing, the bore of which is enlarged toward the end thereby forming a shoulder, and a split ring having a driving fit within the bore and abutting against said shoulder.

HARVEY L. FISHER.

Copies of this patent may be obtained for five cents each, by addressing the "Commissioner of Patents, Washington, D. C."